(12) United States Patent
Colcernian et al.

(10) Patent No.: US 10,380,193 B2
(45) Date of Patent: Aug. 13, 2019

(54) RESULT PROMINENCE IN SEARCH

(71) Applicant: Microsoft Corporation, Redmond, WA (US)

(72) Inventors: Christina Colcernian, Seattle, WA (US); Yinghua Yao, Bellevue, WA (US); Anh Quynh Ly, Seattle, WA (US); Britt H. Hansing, Seattle, WA (US); William James Wagner, Seattle, WA (US); Elia Karagiannis, Seattle, WA (US); Nathan Chalmers, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 14/150,716

(22) Filed: Jan. 8, 2014

(65) Prior Publication Data

US 2015/0193542 A1    Jul. 9, 2015

(51) Int. Cl.
*G06F 17/30* (2006.01)
*G06F 16/9038* (2019.01)

(52) U.S. Cl.
CPC .............................. *G06F 16/9038* (2019.01)

(58) Field of Classification Search
None
See application file for complete search history.

(56) References Cited

U.S. PATENT DOCUMENTS

| 7,610,279 | B2 * | 10/2009 | Budzik | G06F 17/30389 |
| 7,966,316 | B2 | 6/2011 | Cao et al. | |
| 2006/0064411 | A1 | 3/2006 | Gross et al. | |
| 2010/0036720 | A1 | 2/2010 | Jain et al. | |

(Continued)

FOREIGN PATENT DOCUMENTS

| WO | 2008033482 A2 | 3/2008 | |
| WO | WO 2014198008 A1 * | 12/2014 | ....... G06F 17/30867 |

OTHER PUBLICATIONS

"Google Search—Weather", Retrieved on: Dec. 9, 2013, Available at: https://www.google.co.in/search?q=weather&oq=weather&aqs=chrome.0.69i59j0l5.1411j0j7&sourceid=chrome&espv=210&es_sm=93&ie=UTF-8, 1 page.

(Continued)

*Primary Examiner* — Aleksander Kerzhner
*Assistant Examiner* — Eddy Cheung

(57) ABSTRACT

Architecture that computes a definitive answer to a user's top intent of a search query, and positions the top intent answer in a prominent way and at a prominent location of a results page or other search user interface, where the user is most likely to see the top intent answer in an expeditious manner. This may be at the top-most position of the page, above the search results and advertisements, but below the page header and search box. Additionally, the definitive and prominently-placed answer can be presented with an interactive, animated, and/or visually rich element that supplements the original intent. The top intent location can be the boldest element on the page, extend at least one full dimension of the page, use larger fonts and bolder colors than the rest of the search results, and which makes finding the answer easier and faster for the user to locate.

20 Claims, 10 Drawing Sheets

(56) References Cited

U.S. PATENT DOCUMENTS

| | | | |
|---|---|---|---|
| 2010/0114874 A1* | 5/2010 | Hansson | G06F 17/30864 707/722 |
| 2011/0231395 A1 | 9/2011 | Vadlamani et al. | |
| 2011/0258149 A1* | 10/2011 | Kanungo | G06F 17/30882 706/12 |
| 2011/0320440 A1 | 12/2011 | McDonald et al. | |
| 2012/0084279 A1* | 4/2012 | Driscoll | G06F 17/30867 707/722 |
| 2012/0221411 A1 | 8/2012 | Graham, Jr. | |
| 2012/0221560 A1* | 8/2012 | Chevalier | G06F 17/3089 707/723 |
| 2013/0067364 A1 | 3/2013 | Berntson et al. | |
| 2013/0110825 A1* | 5/2013 | Henry | G06F 17/30864 707/723 |
| 2013/0275422 A1* | 10/2013 | Silber | G06F 17/30864 707/728 |
| 2014/0258013 A1* | 9/2014 | Collins | G06Q 30/0625 705/26.3 |
| 2014/0372415 A1* | 12/2014 | Fernandez-Ruiz | G06F 17/30991 707/722 |
| 2015/0161131 A1* | 6/2015 | Provine | G06F 17/30554 707/731 |
| 2015/0169577 A1* | 6/2015 | Gu | G06F 17/30991 707/726 |
| 2015/0205768 A1* | 7/2015 | Fernadez-Ruiz | G06F 17/30867 715/234 |

OTHER PUBLICATIONS

Ripsher, Lawrence, "The Next Phase—Search Blog", Published on: Sep. 16, 2013, Available at: http://www.bing.com/blogs/site_blogs/b/search/archive/2013/09/16/next-phase.aspx, 8 pages.

* cited by examiner

RESULT PROMINENCE IN SEARCH

BACKGROUND

The search process is an important part in accessing the vast amounts of information being exposed for users, particularly with online content. The search process faces many challenges that can impact the user experience. The poor search experience can comprise the difficulty time finding an answer to a query, the speed at which the answer is or is not found, understanding the context of the answer, lack of context visually or interactively, and no logical "follow-up" questions/answers/links to the original query that would help the user explore and discover additional content.

Additionally, advertisements often trump the primary intent, making it more difficult for the user to readily find the answer on the results page. Moreover, certain types of advertisements may typically be the most prominent element on the page, but generally do not answer the user's intent.

Given that search has been a staple for accessing content, users are more adapt and sophisticated in performing the search process, and are now looking for more efficient and effective interfaces that allow them to quickly obtain at the desired results. Other approaches that have attempted to answer search queries do not provide supplementary elements in the form of rich visuals, interactivity, and/or animations in addition to the answer, thereby making it difficult to quickly and easily understand the context of the answer.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture computes a definitive (or top) answer to a user's top intent as derived from and for a search query. The definitive answer is then positioned in a prominent way and at a prominent location of a results page or other search user interface, where the user is most likely to see the definitive answer in an expeditious manner. Typically, this may be at the top-most position of the page, for example, above the search results and advertisements, but below the page header and search box. However, the architecture is not so limited, in that the location can be any suitable place on the page where the user is most likely to easily and quickly perceive the definitive answer. Additionally, the definitive and prominently-placed answer can be presented with interactive, animated, and/or visually rich elements that supplement the original top intent.

The definitive answer (also referred to as the top intent) location can be the most eye-catching (e.g., boldest) element on the page. For example, the top intent location can be full "bleed" (extends at least one full dimension of the page, e.g., horizontally, vertically, etc.), uses larger fonts and bolder colors than the rest of the search results, and which makes finding the answer easier and faster for the user to locate.

The architecture generates the top answer to the user's question, while concurrently providing context, related content, outlets for further discovery, and/or a visual example of the answer in an entertaining and delightful manner.

Note that the disclosed architecture can be applied as well to the promotion of advertisements to a position of prominence in a document, such as the results page or some other suitable document.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
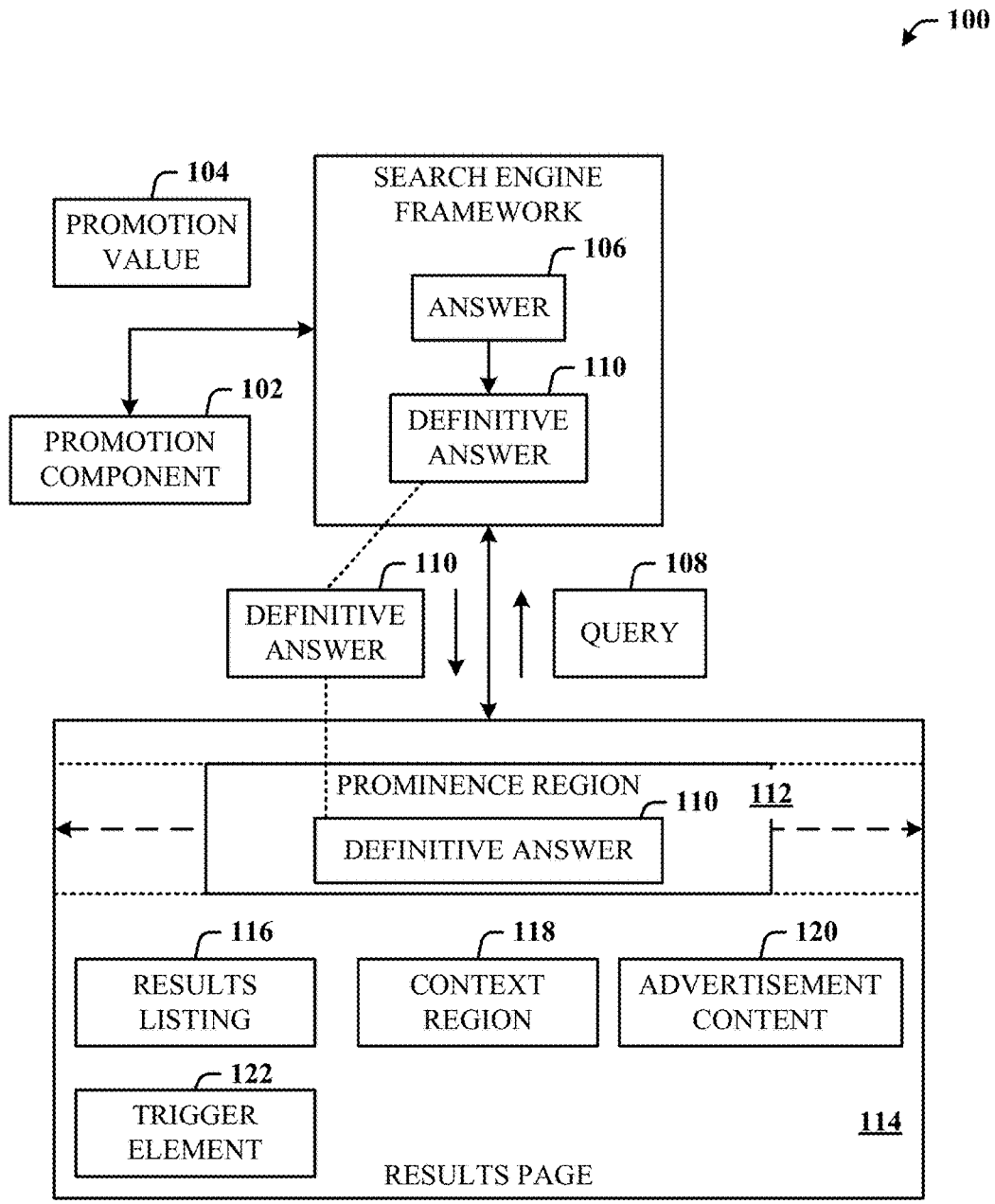
FIG. 1 illustrates a system in accordance with the disclosed architecture.

In search, many queries have multiple or ambiguous intents. For example, a user querying "temple" might want information about the religious structure, Temple University in PA or the subway station in London by the same name. These scenarios can be addressed in a number of ways, such as the earlier mentioned intent disambiguation. However, "high-confidence" queries can be received, which are searches where the intent of the query is very clear and equally clear data exists about what the user is looking for due in large part to the capability to understand search intent (e.g., using advanced machine learning).

The disclosed architecture introduces a new surface area (or prominence region) in the search results page (e.g., at the top of the page) for a result or results where the associated confidence is at such a high level that the user's intent is determined to be definitive, and hence, the answer or answers to the query are also definitive. For example, when it is computed that the user intent is for images of a celebrity, for a specific fact, or for a detailed view of the weather in a particular city, the equally definitive answer provided is integrated into the search results page (or other suitable document) in a prominent way (e.g., at the top of the page). A larger format answer (larger than other results or content on the page) helps the user to readily find the top answer for a question, rather than scan around the results page, as in current implementations. Additionally, the prominence region can be rapidly evolving in format and structure (e.g., animation) to enable users to take an action or navigate deeper into that topic or a related topic.

In one implementation, the architecture is a simply designed, definitive answer to a user's highest intent, positioned in the top-most position of a search results page, above the search results and advertisements, but below the header and search box. Additionally, the definitive answer can be paired with an interactive, animated and/or visually rich element(s) that supplements the original intent.

The definitive answer is presented with the highest prominence (e.g., boldest element(s)) on the page. Additionally, the region can be constructed in a full dimension of the page, and use larger fonts and bolder colors than the other of the search results, or other graphical emphasis, for example, which makes the answer easier and faster for the user to locate. The architecture answers the user's question quickly and definitively, while at the same time, providing context, related content, outlets for further discovery, and/or a visual example of the answer in an entertaining and delightful manner.

In other words, the disclosed architecture provides and presents a definitive answer to a high-intent search query, and the answer is purposefully simple with title-answer-link and the rich content (e.g., to the right). The answer can be paired with an element of interactivity, animation, and/or visual richness that supplements the answer, which helps users obtain context, related content, and/or demonstrates an example of the answer in motion while being be informative, as well as entertaining to view.

The definitive answer is made to appear in the page when the architecture determines programmatically that there is a high confidence that an answer to a query is the definitive answer. In one implementation, the prominence region in which the definitive answer is presented, is positioned at the top of a search results page, above advertisements and search results, but below the header and search box, which helps the user to readily identify the answer before other content on the page.

The generation and presentation of the definitive answer can be, but not necessarily, triggered when an algorithm ranks the answer sufficiently high enough (based on a threshold value) to be placed in the prominence region. Additionally, the definitive answer can be, but not necessarily, editorially curated, purposefully aesthetic and differentiated from the rest of the content of the search page (or other type of document), linked with the search engine homepage and/or search engine monetization schemes such as rewards.

The generation and presentation of the definitive answer can include a follow-up question, link, and/or query, appear in all devices (e.g., mobile, tablet, game machine, etc.), and contain subtle auto-play animations. Click signals as well as monetization signals can be monitored to determine when the content is the top intent, and then determine whether it is suitable for prominent (e.g., top-of-the-page) placement.

The disclosed architecture essentially comprises a user experience (UX), triggering, placement, and data. With respect to user experience, the prominence region is a new region on a search results page (or other suitable document). The prominence region is instrumented (logged) as a separate region. The definitive answer may be presented by itself or according to a different UX template. When the prominence region (or definitive answer) is triggered, the answer response can indicate the specific template for rendering in the prominence region. The template can be composed of common or custom UX controls. Common controls are shared controls that are generic and can be utilized in multiple scenarios. Custom UX controls are created for a specific scenario.

Templates constructed that relate to airline flight status, reference, weather, news, seasonal holidays, events, movies, countries, foods, major cities, celebrities, and the like, can be utilized.

The interactive components of the prominence region can be written using JavaScript™ and activated on an input device click, hover, or on page load, for example. The prominence region can be implemented by applying HTML (hypertext markup language) markup, CSS (cascading style sheet) styling, JavaScript code and image files to the search results page to cause the client browser to display the region in the appropriate location within the page.

The HTML markup comprises tags, which create organizational structure for the textual content and visual elements. The CSS styles provide positional, font and color instructions to the client. Animations and user interactions can be created through JavaScript code. Image files may be provided in one or more formats including PNG (portable network graphics) or JPEG (Joint Photographic Expert Group), for example. Implementation of visual or interactive elements may also be achieved through additional technologies including, but not limited to, ActiveX™ controls, Java™ applets, Silverlight™ plugins, and/or SVG (scaled vector graphics) canvases.

SVG uses a tag-based system (similar to HTML) to specify the instructions for drawing an image, rather than like raster images where the color of each pixel is specified. Modern browsers have begun supporting SVG innately with the ability to use JavaScript to generate the SVG tags and manipulate the tags programmatically. Thus, an SVG canvas is an area of the page designated as SVG content through the use of the <svg> tag. This occurs on the client. The browser reads the HTML, CSS and JavaScript, and acts on it to produce the prominence region and display the images (content).

Animations may be triggered via user interaction, automatically after the page is loaded, or by set or random timers, for example. The animations can be achieved by using JavaScript to manipulate style properties such as position, size, opacity, and background image offsets of the visual elements at a set interval so as to produce a smooth animation effect.

Interactivity combines visual elements with client mouse or touch events to trigger animations and/or page navigation when the user moves the mouse cursor, clicks, taps, drags, or otherwise interacts with the prominence region. Visual elements inform and direct the user to elements which have been designated as interactive. JavaScript is then used to attach handler functions to the appropriate client events. These handler functions, when triggered, execute the code that produces the desired animations or page navigation.

Triggering the generation of the prominence region can occur explicitly and implicitly. Explicitly, the region is triggered based on a user click on the home page or other feature that is explicitly programmed to trigger the prominence scenario. Implicitly, the region is triggered based on a user query.

In the explicit case, typically, the region is triggered based on a "whitelist" (or register) of accepted, approved, or recognized queries, and only rendered if a specific set of form codes is attached to the URL (uniform resource locator). This ensures the region only triggers when coming from an explicit entry point. A benefit is that the intent is very clear as the user had to click on a specific feature in order to get the region. Thus, there can be a different experience when the user issues the same query, but not coming from that explicit entry point.

In the implicit case, the region may be a promotion of an existing answer scenario into the prominence region for a high intent set of queries. A ranker determines when the intent is sufficiently high for the promotion to a definitive answer. The ranker can also consider monetization signals and rank of the existing answer. Monetization signals are used to determine whether or not the decision to place an answer in the prominence region will significantly regress revenue.

Ranking can be provided by answer triggers, machine learning (ML) models, and satisfaction of the top intent. With respect to answer triggers, a prominent weather answer can be a weather answer that was promoted to the prominence position when the weather answer would have been ranked at the top position in the search results page. Thus, the triggering can be a combination of an existing weather answer triggering logic, which can be anything, including whitelist, classifier, grammar, etc., and the prominence triggering logic which uses additional signals (e.g., whether the segment has a high advertisement intent and if the existing answer would have been ranked at position one).

The answer can be ranked using a series of ML models which determine the position on the page where the answer will receive the best user engagement. Answers that satisfy the "top intent" (as determined via an ML model) of the query for the vast majority of users are than identified and promoted to the prominence position. It is to be understood that the answer does not need to have been placed at the top of the ranking to qualify for promotion to the prominence region.

As described herein, the prominence region is placed separately from the advertisements (e.g., at the top of the page above the advertisements) so that the user view is not muddled with the myriad of advertisements, media types, content, and animations. When the ranker determines that the prominence region should trigger explicitly or implicitly, the ranker returns the answer with a region indication code, such as "pole" (for pole position, which is equivalent in understanding as the prominence region), for example.

As described herein, the prominence region can be generated according to different placements, such as a horizontal placement or a vertical placement. Horizontal regions can be "full bleed" (extended across the top of the page (below header and above advertisements and context region)). Vertical regions may also be on the top of the page above advertisements but rather than above context region, this region can be generated to the left of the context region (this is described hereinbelow).

Prominence region data may be derived from a regular answer such as weather, images, etc. The data from these regular answers can be stored in a number of locations such as a feeds index, etc. Additionally, prominence region data can be editorially programmed.

The prominence region can have a variable height, and the width can span the column width of the normal results listing or the full width of the page, and then potentially, infinitely. In one implementation, the answer content in the prominence region is triggered for presentation, only, after being confident that the user wants (based on user intent) this answer. Editorial content for holidays and events can be made to occur in the prominence region and have interactive properties, including animations or user-triggered events.

Offline components such as a judgment tasker algorithm can be used to evaluate the correctness of the promotion machine-learning model, in the general sense. Not all queries which are promoted to the prominence region may have been evaluated for the appropriateness of an answer type and relevance to the answer content. The appropriateness and relevance metrics can be scaled such that failure to qualify for either or both of these metrics, in the model, results in failure of the answer to be elevated to prominence.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a promotion component 102 configured to compute a promotion value 104 that indicates if an answer 106 to a query 108 is a definitive answer 110. A prominence region 112 can be generated in a results page 114 (or other suitable document) in which the definitive answer 110 is presented in the prominence region 112. The prominence region 112 is generated specifically for the presentation of the definitive answer 110, and the prominence region 112 is generated and presented separately from a results listing 116, a context region 118, and advertisement content 120 of the results page 114.

The prominence region 112 is generated and the definitive answer 110 presented, only when the promotion value 104 indicates the answer 106 is the definitive answer 110. The prominence region 112 can extend a maximum viewable dimension (e.g., full horizontal, full vertical, etc.) of the results page 114. The generation of the prominence region 112 in the results page 114 can be automatically triggered based on the determination of the definitive answer 110. The generation of the prominence region 112 in the results page 114 can be based on user interaction with a specifically-defined trigger element 122 of the results page 114. Various examples of animation are illustrated herein.

It is to be understood that in the disclosed architecture, certain components may be rearranged, combined, omitted, and additional components may be included. Additionally, in some embodiments, all or some of the components are present on the client, while in other embodiments some components may reside on a server or are provided by a local or remove service.

The disclosed architecture finds applicability to many different device form factors, such as smartphones, tablets, portable computers, desktop computers, and the like.

User interaction with the client user interface that comprises the results page 114 can be gesture-enabled, whereby the user employs one or more gestures for interaction. For example, the gestures can be natural user interface (NUI) gestures. NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

Figure 2:
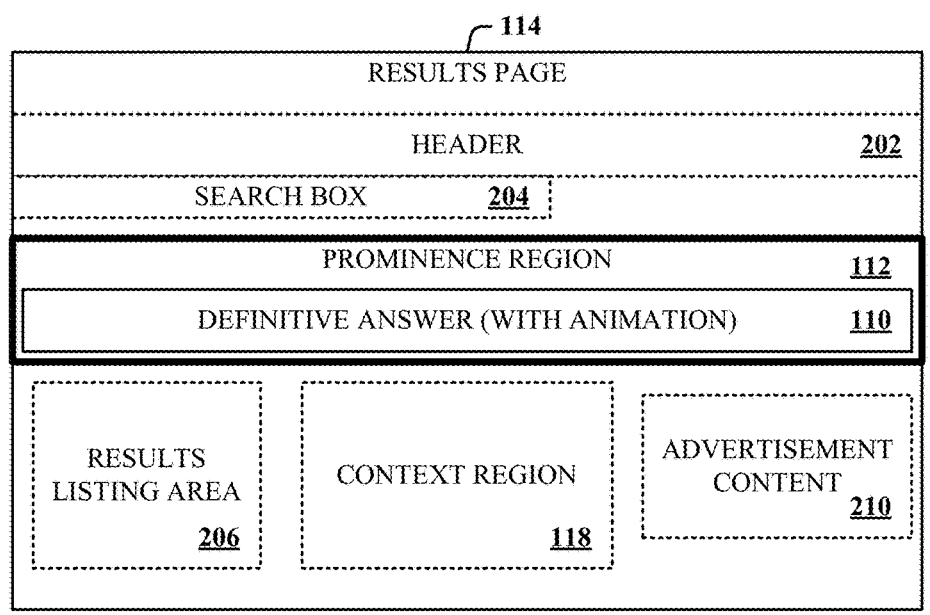
FIG. 2 illustrates a more detailed view of the results page and the elements thereof.

FIG. 2 illustrates a more detailed view of the results page 114 and the elements thereof. Note that the detailed view here, of the results page 114, is intended to be only one example of a results page layout. While FIG. 2 and the associated description relate to the use of the prominence region 112 in this view, it is to be understood that the prominence region 112 can be employed with many different page layouts than what is shown as well as other document types (e.g., a word processing document, a spreadsheet document, etc.).

The typical results page 114 can comprise a header area 202 (e.g., where a menu is presented), and a search box area 204 (e.g., where a query is entered), as well as a results listing area 206 (e.g., where the results listing 116 is presented), the context region 118 (where additional search-related content can be presented), and advertisement content area 210. The advertisement content area 210 is intended to include one or more of different possible areas located in the result page 114.

In this depiction, the prominence region 112 is generated interstitial to, advertisements and search results of the results page 114 and, the page header 202 and the search box 204 of the results page 114. Thus, the prominence region 112 is located relatively near or at the top of the results page 114, since users may tend to scan the page in a top-down manner, and hence, will view the definitive answer 110 The definitive answer 110 can be presented in the prominence region 112 with interactive animation as well.

It is to be understood, however, that for users who may prefer to read content right-to-left, the prominence region 112 can be presented in a vertical fashion in a rightmost position, and for users who may prefer to read content left-to-right, the prominence region 112 can be presented in a vertical fashion in a leftmost position. In yet another example implementation, those users who may be visually debilitated may have the prominence region 112 presented in a way where the user may be first inclined to perceive the results page 114 such as in a centered view for a user with tunnel vision, in a peripheral view for a user with macular degeneration, audibly for a more extensive visual impairment, and so on.

The prominence region 112 is readily expandable to present rich content as well. Additionally, once the prominence region 112 comprises additional rich content and animation, the generation process automatically displaces the other areas/regions of the results page 114. The height of the prominence region 112 can be variable and the horizontal length can span the horizontal length of the search results or the entire width of the viewable area of the results page 114. Other graphical emphasis can be applied to draw the user's attention first to the prominence region 112, such as flashes, blinking on/off colors, font changes, audio supplementations, etc. Moreover, the dimensional variability of the prominence region 112 applies equally to vertical regions as well.

Following is a description of exemplary answers promoted to prominence and produced with animation. In some instances the promoted content can be the top definitive answer as generated based on the top intent of the user query. In other instances, the promoted content can be one or more advertisements that definitively answer the user's top intent of the query. Thus, the architecture can "cross-over" between promoting a search result as the top answer to returning an advertisement as the top answer, and vice versa.

Figure 3:
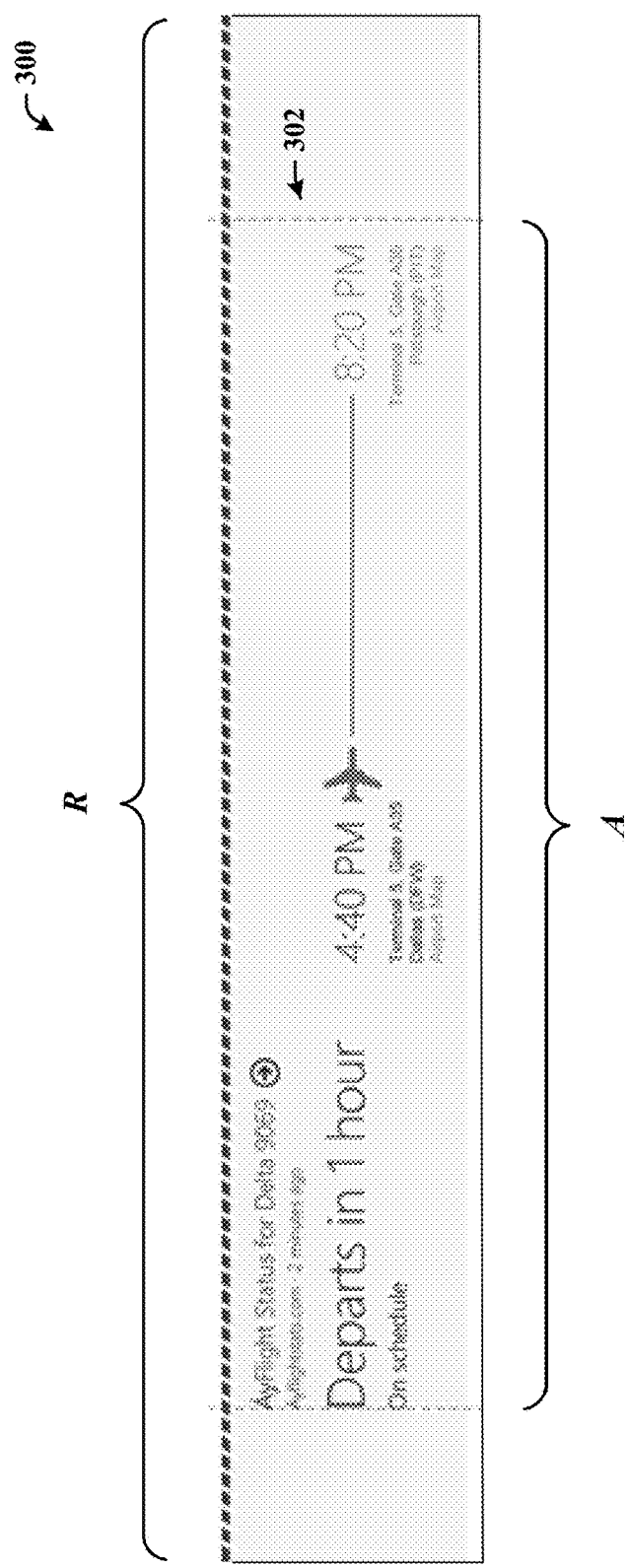
FIG. 3 illustrates a prominence region having an animated top answer presented in the prominence region as relates to airline flight information.

FIG. 3 illustrates a prominence region 300 having an animated top answer 302 presented in the prominence region 300 as relates to airline flight information. The top answer 302 includes one or more interactive elements such as, the airline name ("Delta"), flight number ("9069"), source of the flight status information (AyFlightstats.com"), age of the flight status information (e.g., "2 minutes ago"), relative departure time ("Departs in 1 hour"), departure status (e.g., "On schedule"), scheduled flight departure time ("4:40 PM") and arrival time ("8:20 PM"), departing terminal ("Terminal 5"), departing gate ("Gate A35"), and departing airport name ("Dallas (DFW)"), a link to the departing airport website map ("Airport Map"), destination terminal ("Terminal 5"), destination gate ("Gate A35"), and destination airport name ("Pittsburg (PIT)), and a link to the destination airport website map ("Airport Map").

The top answer 302 in the prominence region 300 is animated by the inclusion of at least an airplane icon that moves along a line that extends from the "4:40 PM" graphic to the "8:20 PM" graphic, as well as updating gate information as it may change, and the age information of the most recent update (e.g., "2 minutes ago"). Other animations can be provided as desired.

Note also that although the prominence region 300 may extend the entire width R of the page, the animated answer 302 extends only a subset of that width R, a width A, as needed to present the top answer and for a pleasant user experience.

Figure 4:
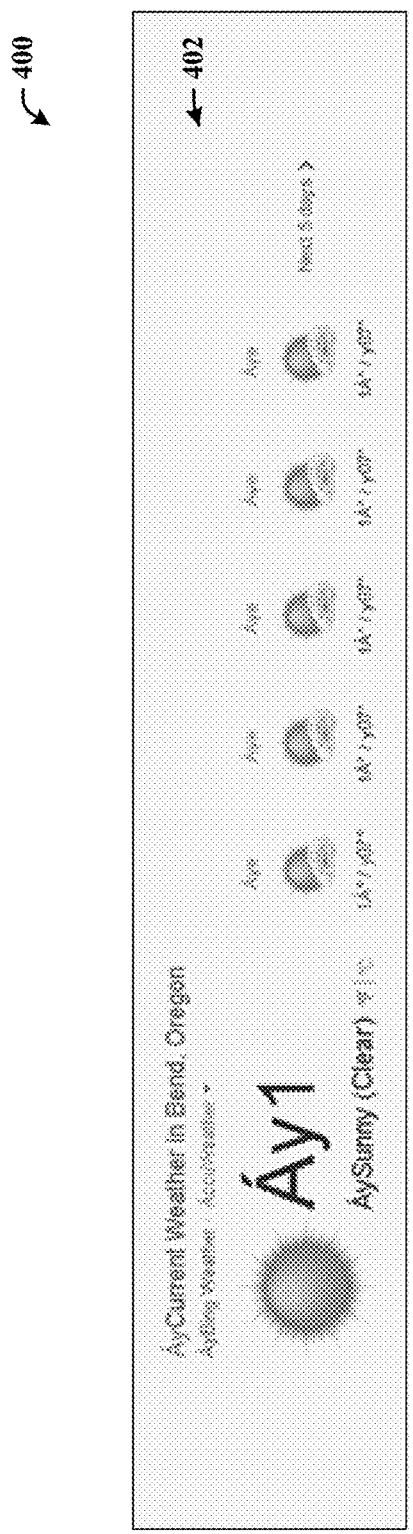
FIG. 4 illustrates a prominence region having an animated top answer presented in the prominence region as relates to weather information.

FIG. 4 illustrates a prominence region 400 having an animated top answer 402 presented in the prominence region 400 as relates to weather information. The top answer 402 includes one or more interactive elements such as, the current weather ("AyCurrent") for a city/state ("Bend, Oreg."), a link to AccuWeather website, an animated sun icon, description of the current weather ("Sunny(clear)"), the 5-day forecast with animated icons (as sunny and partly cloudy), and a link to the next five days. The temperature can be switch between Fahrenheit and centigrade.

Note also that although the prominence region 400 may extend the entire width of the page, the animated answer 402 extends only a subset of that width, as needed to prominently present the top answer and for a pleasant user experience.

The top answer 402 in the prominence region 400 can include animation by the inclusion of the sun that shows movement in the beams emanating therefrom, rain and lightning bolts for rainy weather, tornados for possible strong winds or weather warnings, automated temperature conversion between centigrade and Fahrenheit, moving water for possible flash flood warnings, flying kites for days with moderate wind and sunny weather, falling snow for snow showers, ice skaters for icy road conditions, etc. Other animations can be provided as desired.

Figure 5:
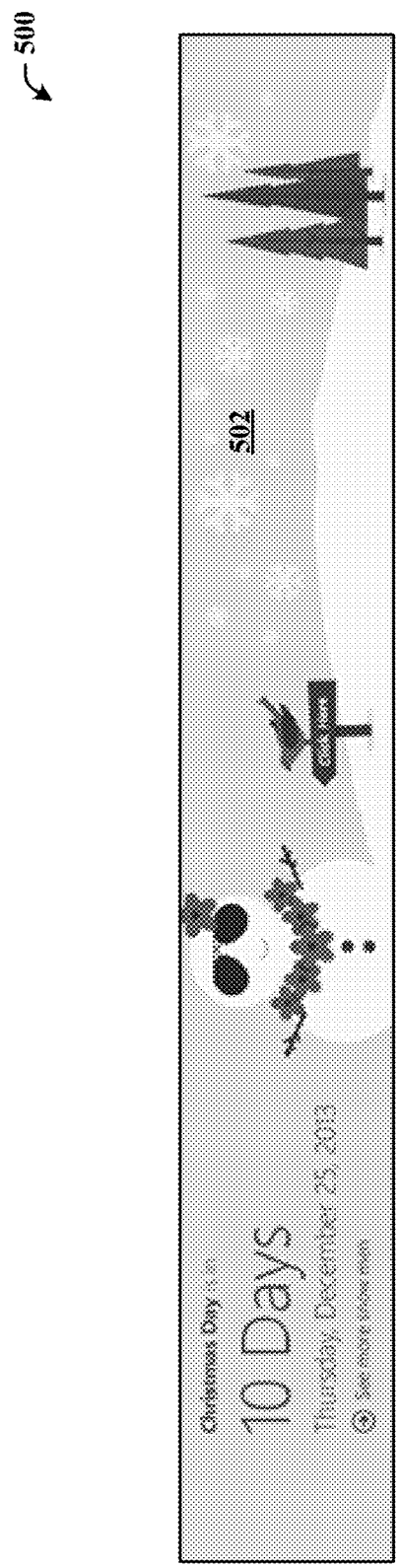
FIG. 5 illustrates a prominence region having an animated top answer presented in the prominence region as relates to holiday information.

FIG. 5 illustrates a prominence region 500 having an animated top answer 502 presented in the prominence region 500 as relates to holiday information. The top answer 502 includes one or more interactive elements, such as the holiday descriptor ("Christmas Day is in"), the number of days to the holiday ("10 Days"), the specific holiday date information ("Thursday, Dec. 25, 2013").

Given that this particular holiday typically involves cold and snowy weather, the animation can include a snowman, falling snowflakes, pine trees, an annotated control with a perched bird ("Click Here"), and a control that when selected, presents a different style of snowman. Additionally, when the user selects the "Click Here" control, the snowman changes appearance by randomly shuffling through a series faces and bodies. Note also that this top answer 502 fills and extends the full length of the prominence region 500 to prominently present the top answer 502 and for a pleasant user experience.

Figure 6:
FIG. 6 illustrates a prominence region having an animated top answer presented in the prominence region as relates to movie information.

FIG. 6 illustrates a prominence region 600 having an animated top answer 602 presented in the prominence region 600 as relates to movie information. The top answer 602 includes one or more interactive elements, the query ("The legendary shower scene was from . . . "), the movie name ("Psycho"), a trivia question from the movie ("According to Norman Bates . . . "), an explorative control that enables the user to select a new trivia question, and a screen location of the shower scene ("Bates Motel").

Given that this particular movie was a dark thriller, the animation can include a rolling darkness in the background, and perhaps a short audio clip played of music during the shower scene murder, and a blinking "Bates Motel" sign, for example. Other Halloween horror film animations can be provided for top answers. Note also that this top answer 602 fills and extends the full length of the prominence region 600 to prominently present the top answer and for a pleasant user experience.

Figure 7:
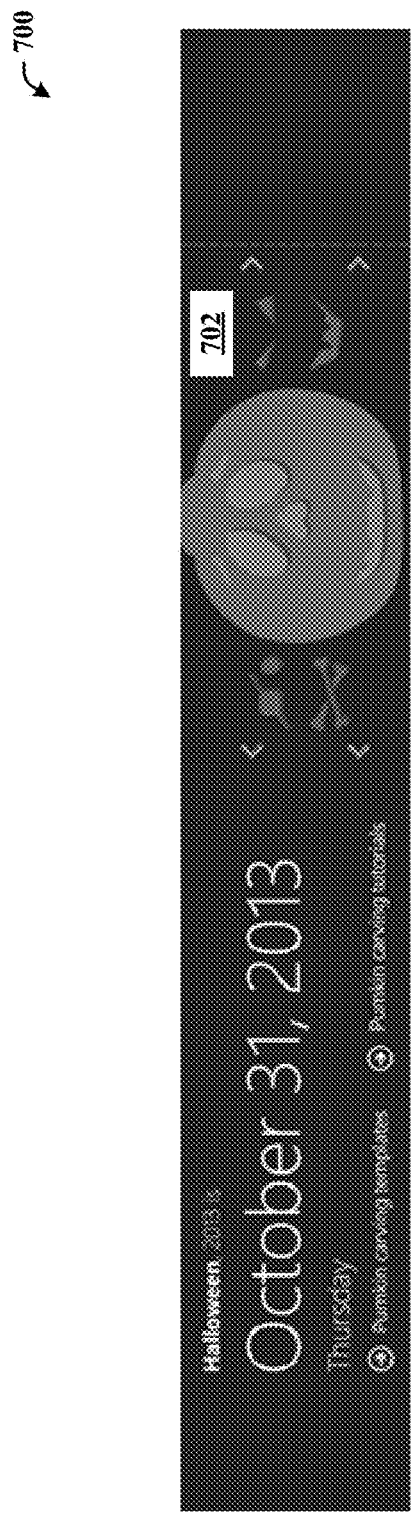
FIG. 7 illustrates a prominence region having an animated top answer presented in the prominence region as relates to a day of celebration.

FIG. 7 illustrates a prominence region 700 having an animated top answer 702 presented in the prominence region 700 as relates to a day of celebration. The top answer 702 includes one or more interactive elements, the query ("Halloween 2013 is . . . "), the date of the celebration ("Oct. 31, 2013"), the day of the week of the celebration ("Thursday"), links to pumpkin carving templates and pumpkin carving tutorials, and left and right controls that enable scrolling through various different types of pumpkin carving features.

The user can interact with the controls to pan through different eyes, noses, and mouths to create different pumpkins. Clicking on the pumpkin shows a random combination of carved features.

Note also that although the prominence region 700 may extend the entire width of the page; however, the animated answer 702 extends only a portion of that width, as needed to prominently present the top answer 702 and for a pleasant user experience.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
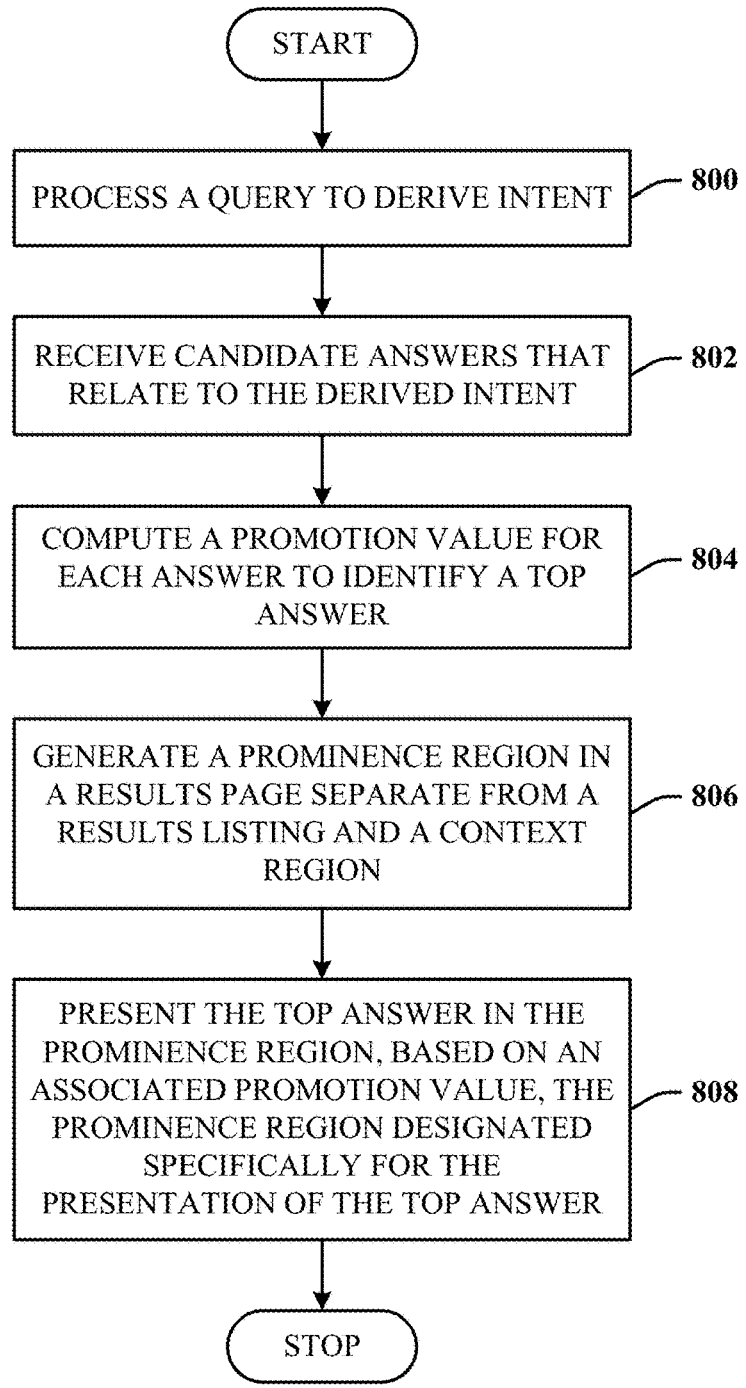
FIG. 8 illustrates a method in accordance with the disclosed architecture.

FIG. 8 illustrates a method in accordance with the disclosed architecture. At 800, a query is processed to derive intent. At 802, candidate answers that relate to the derived intent, are received. At 804, a promotion value is computed for each candidate answer to identify a top answer. At 806, a prominence region is generated in a results page separate from a results listing and a context region. At 808, the top answer is presented in the prominence region, based on an associated promotion value. The prominence region is designated specifically for the presentation of the top answer.

The method can further comprise presenting the top answer with interactive animation, in the prominence region. The method can further comprise preventing generation of the prominence region and presentation of the top answer based on the promotion value. The method can further comprise generating the prominence region to extend a maximum viewable dimension of the results page.

The method can further comprise generating the prominence region above advertisements and search results of the results page. The method can further comprise generating the prominence region below a page header and a search box of the results page. The method can further comprise automatically triggering generation of the prominence region in the results page based on the top answer being a definitive answer of the query.

The method can further comprise generating and presenting the top answer in the prominence region, based on user interaction with a specifically-defined trigger element of the results page. The method can further comprise generating and presenting the top answer in the prominence region, based on a computed probability that the top answer is a definitive answer to a top intent (of a derived intent).

Figure 9:
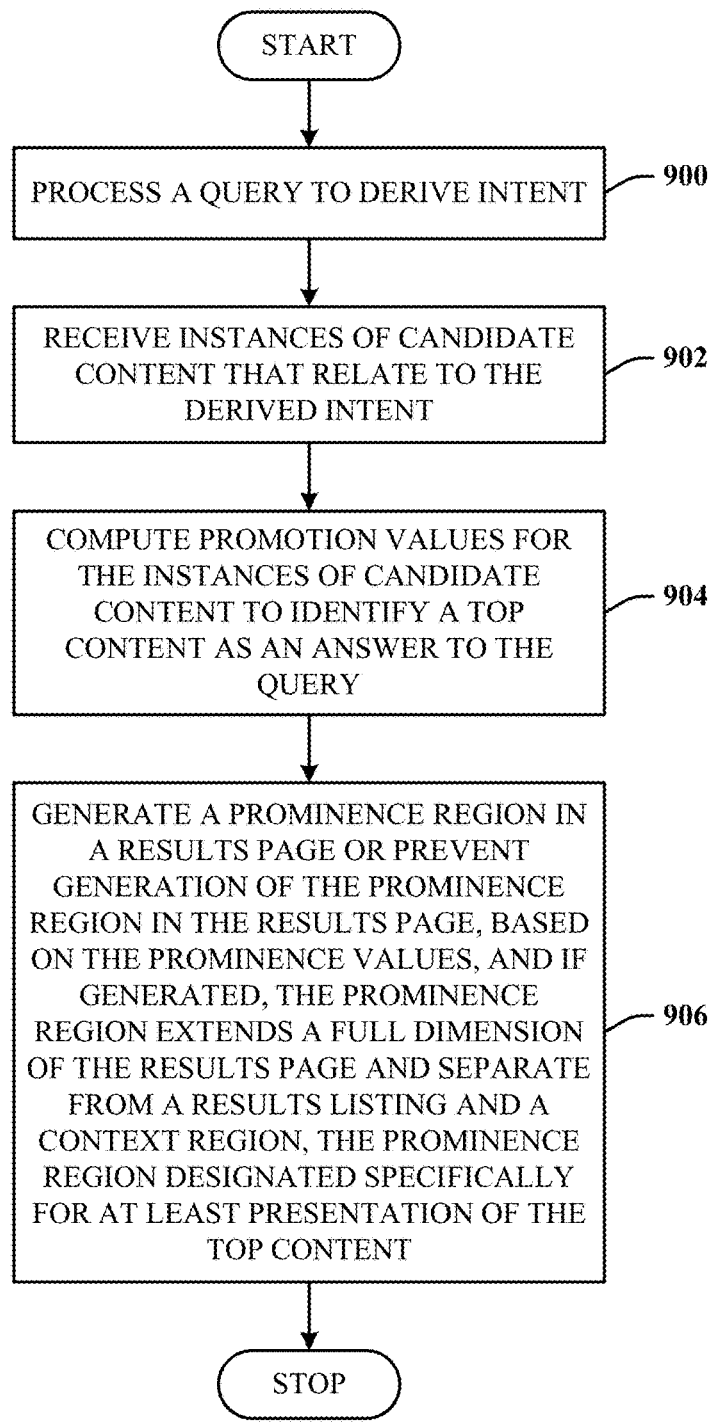
FIG. 9 illustrates an alternative method in accordance with the disclosed architecture.

FIG. 9 illustrates an alternative method in accordance with the disclosed architecture. The method can be embodied on a computer-readable storage medium as computer-executable instructions that when executed by a microprocessor, cause the microprocessor to perform acts of the method. At 900, a query is processed to derive intent. At 902, instances of candidate content are received that relate to the derived intent. The content can be search results, advertisements, or any suitable content. At 904, promotion values are computed for the instance of candidate content to identify a top content as an answer to the query. At 906, a prominence region is generated in a results page or prevented from generation of the prominence region in the results page, based on the prominence values. If generated, the prominence region can extend a full dimension of the results page (e.g., the full width, full height, full diagonal, etc.). The prominence region can also be separate from a results listing and a context region, and designated specifically for at least presentation of the top content.

Note that although described herein for usage with a results page, it is to be understood that the disclosed architecture finds applicability to other document types such as a home page or a general application document, and for other purposes. Any subscriber or other website that provided suitably compatible signal can have its content promoted into the prominence region to satisfy a need. For example, a definition can be inserted for promotion from another place or source based on click on a word as part of a search, where the user is reading an article or a book.

The method can further comprise presenting the top content in the prominence region with interactive animation. The method can further comprise generating the prominence region above a region of advertisements and search results of the results page and below a page header and a search box of the results page.

The method can further comprise automatically triggering generation of the prominence region in the results page based on the top content representing a definitive answer to the query. The method can further comprise generating and presenting the top content in the prominence region based on user interaction with a specifically-defined trigger element of the results page or a computed probability that the top content is representative as a top answer to the query.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
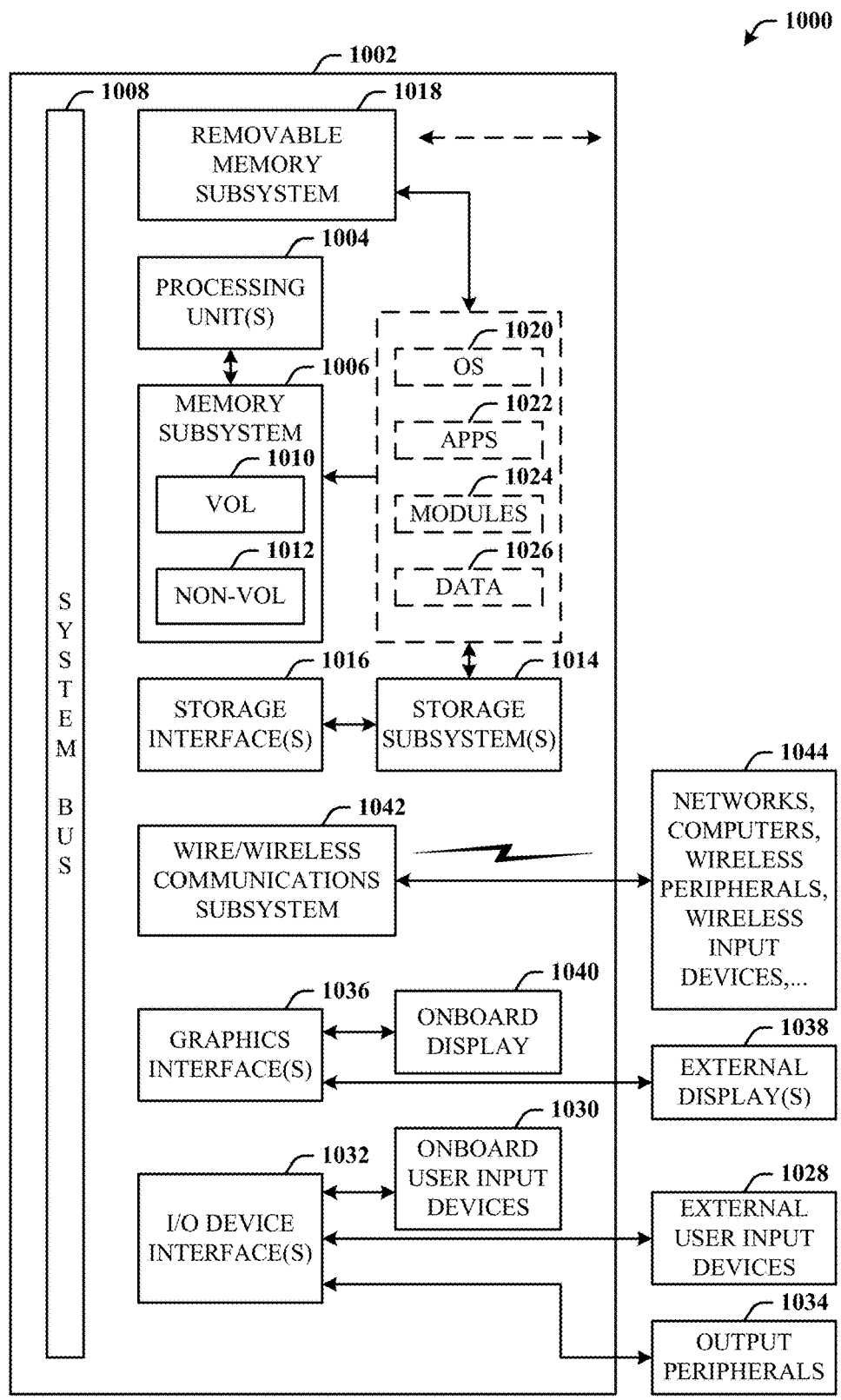
FIG. 10 illustrates a block diagram of a computing system that executes result or answer prominence in accordance with the disclosed architecture.

Referring now to FIG. 10, there is illustrated a block diagram of a computing system 1000 that executes result or answer prominence in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having microprocessing unit(s) 1004 (also referred to as microprocessor(s) and processor(s)), a computer-readable storage medium such as a system memory 1006 (computer readable storage medium/media also include magnetic disks, optical disks, solid state drives, external memory systems, and flash memory drives), and a system bus 1008. The microprocessing unit(s) 1004 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1002 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1006 can include computer-readable storage (physical storage) medium such as a volatile (VOL) memory 1010 (e.g., random access memory (RAM)) and a non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the microprocessing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components and circuits. The storage subsystem(s) 1014 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include items and components of the system 100 of FIG. 1, items and components of the results page 114 of FIG. 2, the prominence region 300 of FIG. 3, the prominence region 400 of FIG. 4, the prominence region 500 of FIG. 5, the prominence region 600 of FIG. 6, the prominence region 700 of FIG. 7, and the methods represented by the flowcharts of FIGS. 8 and 9, for example.

Generally, programs include routines, methods, data structures, other software components, etc., that perform particular tasks, functions, or implement particular abstract data types. All or portions of the operating system 1020, applications 1022, modules 1024, and/or data 1026 can also be cached in memory such as the volatile memory 1010 and/or non-volatile memory, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1002, and include volatile and non-volatile internal and/or external media that is removable and/or non-removable. For the computer 1002, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1002, programs, and data using external user input devices 1028 such as a keyboard and a mouse, as well as by voice commands facilitated by speech recognition. Other external user input devices 1028 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 1002, programs, and data using onboard user input devices 1030 such a touchpad, microphone, keyboard, etc., where the computer 1002 is a portable computer, for example.

These and other input devices are connected to the microprocessing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a hardware microprocessor, and a memory device that stores computer-executable instructions, the computer-executable instructions executed by the microprocessor to cause the microprocessor to enable:
a promotion component configured to compute a promotion value for candidate responses to a received query, wherein the promotion value indicates a likelihood that the candidate responses are a definitive answer to the received query based on an evaluation of a determined intent of the received query and an evaluation of data associated with the candidate responses;
a prominence region component configured to generate a prominence region that presents, in a results page, content for a candidate response in a separate region from a search results listing and advertising content, wherein generation of the prominence region comprises:
ranking the candidate responses based on the computed promotion value of the candidate responses, wherein the ranking comprises applying one or more machine learning models that selects the candidate response from a ranking of the candidate responses and provides a region indication for positional display of the prominence region based on the selected candidate response; and
a user interface component configured to optimize presentation of a search user interface based on results provided by the prominence region component, wherein optimization of the search user interface comprises:
determining a position on the results page for display of the prominence region based on the region indication provided from the ranking,
generating the results page that comprises the prominence region located at the determined position, wherein the prominence region comprises content for the selected candidate response including rich interactive content, and
outputting, through the search user interface, the generated results page for display.

2. The system of claim 1, wherein the prominence region can be positioned anywhere and in any dimension, which includes extending a maximum viewable dimension of the results page, the prominence region interstitial to, advertisements and search results of the results page and, a page header and a search box of the results page.

3. The system of claim 1, wherein the generation of the prominence region in the results page is based on user interaction with a specifically-defined trigger element of the results page.

4. The system of claim 1, wherein the selected candidate response is presented in the prominence region with the graphical emphasis comprising interactive animation, and wherein the prominence region comprising interactive animation trigger points for selection of content associated with the selected candidate response.

5. The system of claim 1, wherein the prominence region component is further configured to determine an alignment and dimensions of the prominence region based on the selected candidate response and the determined position for display of the prominence region.

6. The system of claim 5, wherein determined alignment is one or more selected from: a vertical alignment and a horizontal alignment.

7. The system of claim 1, wherein the generating of the results page further comprises selecting a user interface template for display that optimizes the search user interface based on processing results of the prominence region component.

8. A computer-implemented method, comprising computer-executable instructions that when executed by a hardware processor cause the processor to perform acts of:
processing a query to derive intent;
receiving candidate answers that relate to the derived intent;
computing a promotion value for each candidate answer of the candidate answers, wherein the promotion value is a likelihood that the candidate answers are a definitive answer to the query based on an evaluation of the derived intent and an evaluation of data associated with the candidate answers;
ranking the candidate answers based on the computed promotion value of the candidate answers, wherein the ranking comprises applying one or more machine learning models that selects a candidate answer from a ranking of the candidate answers and provides a region indication for positional display of a prominence region based on the selected candidate answer;
determining a position on a results page where the prominence region is to be displayed, through a search user interface, based on the region indication provided from the ranking;
generating the results page for the search user interface, wherein the results page comprises the prominence region at the determined position in the results page separate from a results listing, and wherein the prominence region comprises content for the selected candidate answer including rich interactive content; and
presenting, through the search user interface, the results page including the generated prominence region.

9. The method of claim 8, wherein the selected candidate answer is presented in the prominence region with the graphical emphasis comprising interactive animation, and wherein the prominence region comprises interactive animation trigger points for selection of content associated with the selected candidate answer.

10. The method of claim 8, wherein the generating of the prominence region comprises extending the prominence region to a maximum viewable dimension of the results page.

11. The method of claim 8, further comprising generating the prominence region above advertisements and search results of the results page, the prominence region can be positioned anywhere on the results page and in any dimension.

12. The method of claim 11, further comprising generating the prominence region below a page header and a search box of the results page, the prominence region can be positioned anywhere on the results page and in any dimension.

13. The method of claim 8, further comprising automatically triggering generation of the prominence region in the results page based on identification of the selected candidate answer.

14. The method of claim 8, further comprising: determining an alignment and dimensions of the prominence region based on the selected candidate answer and the determined position for display of the prominence region.

15. The method of claim 14, wherein determined alignment is one or more selected from: a vertical alignment and a horizontal alignment.

16. A computer-readable hardware storage medium comprising computer-executable instructions that when executed by a microprocessor, cause the microprocessor to perform acts of:

processing a query to derive intent;

receiving instances of candidate content that relate to the derived intent;

computing promotion values for the instances of candidate content, wherein the promotion value is a likelihood that the candidate content is a definitive answer to the query based on an evaluation of the derived intent and an evaluation of the candidate content;

ranking the candidate content based on the computed promotion value of the candidate content, wherein the ranking comprises applying one or more machine learning models that selects content for a response from a ranking of the candidate content and provides a region indication for positional display of a prominence region based on the selected content;

determining a position on a results page where the prominence region is to be displayed, through a search user interface, based on the region indication provided from the ranking;

generating the results page for the search user interface, wherein the results page comprises the prominence region at the determined position in the results page separate from a results listing and advertising content, and wherein the prominence region comprises rich interactive content for the selected content; and presenting, through the search user interface, the results page including the generated prominence region.

17. The computer-readable hardware storage medium of claim 16, wherein the selected content is presented in the prominence region with the graphical emphasis comprising interactive animation, and wherein the prominence region comprises interactive animation trigger points for the selected content.

18. The computer-readable hardware storage medium of claim 16, further comprising generating the prominence region above a region of advertisements and search results of the results page and below a page header and a search box of the results page.

19. The computer-readable hardware storage medium of claim 16, wherein the performed acts further comprising: determining an alignment and dimensions of the prominence region based on the selected content and the determined position for display of the prominence region.

20. The computer-readable hardware storage medium of claim 19, wherein determined alignment is one or more selected from: a vertical alignment and a horizontal alignment.

* * * * *